July 15, 1958 P. C. DURLAND 2,842,900
FRICTION AUGMENTER FOR INTERNAL GRINDING MACHINES
Filed Aug. 6, 1957 2 Sheets-Sheet 1

INVENTOR
Philip C. Durland
BY Sughrue and Rothwell
ATTORNEYS

July 15, 1958 P. C. DURLAND 2,842,900
FRICTION AUGMENTER FOR INTERNAL GRINDING MACHINES
Filed Aug. 6, 1957 2 Sheets-Sheet 2
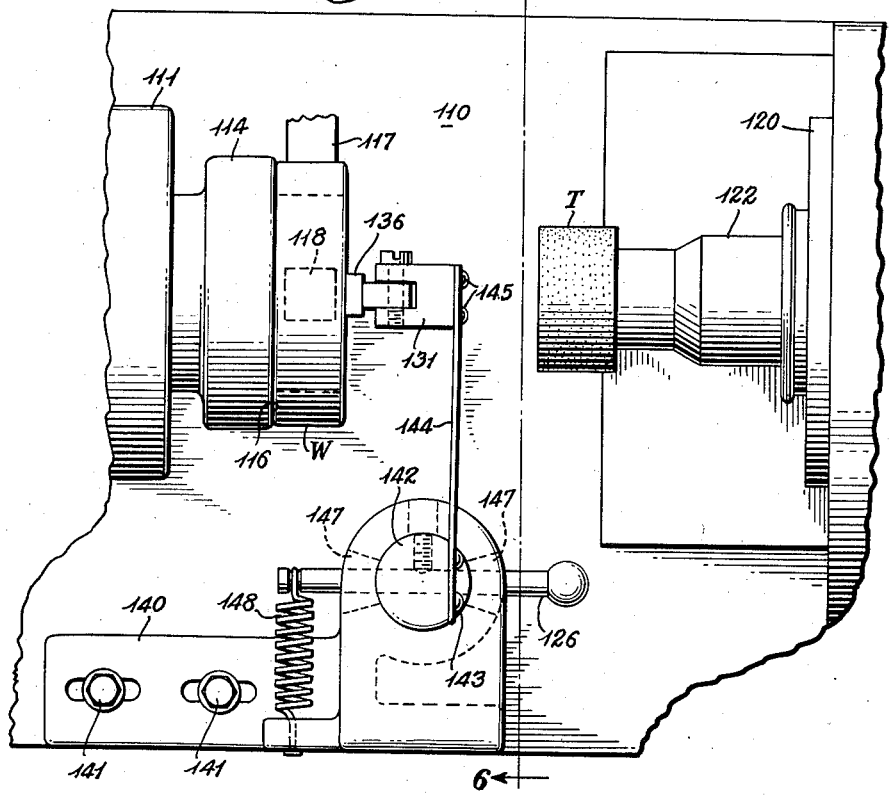
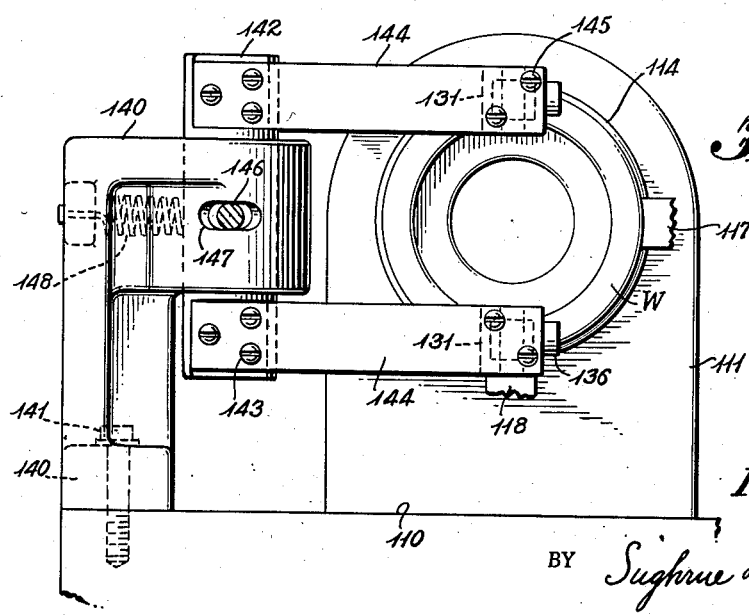
INVENTOR
*Philip C. Durland*
BY *Sughrue and Rothwell*
ATTORNEYS

United States Patent Office 2,842,900
Patented July 15, 1958

2,842,900
FRICTION AUGMENTER FOR INTERNAL GRINDING MACHINES

Philip C. Durland, Springfield, Vt., assignor to Bryant Chucking Grinder Company Application August 6, 1957, Serial No. 676,617

8 Claims. (Cl. 51—103)

This invention relates to centerless grinders for generating a surface of revolution on an annular workpiece radially supported on a periphery by at least one workrest, and axially supported by an end face of the workpiece held against a face portion of a rotatable spindle, this spindle rotating the workpiece at a controlled rate of speed. A machine of this general class is disclosed in U. S. Patent No. 2,772,526, and this patent more particularly illustrates an arrangement of magnetic means to hold the workpiece against the face portion of the rotatable spindle.

It should be noted that this spindle is commonly identified as a "driver"; however, while the spindle acts as a driver in the absence of forces introduced when the tool is applied to the workpiece, during the grinding process the function of this spindle often is to act as a retarder to prevent the workpiece from "spinning" any faster than the desired rate of speed. It is clear that with the spindle and tool rotating in the same direction, this "spin" is caused by the tooling forces which tend to rotate the workpiece at the common velocity of the contacting surfaces. This spin occurs particularly where the driver is a magnetic device and the end face of the workpiece held there against is a narrow rim.

Therefore, an object of this invention is to provide means to augment the frictional holding forces acting on the workpiece.

Another object is to provide a device for the stated purpose combining simplicity of structure with flexibility of adjustment.

Still another object is to mount this structure to avoid interference with the auxiliary functions of the grinder; i. e., loading, gaging, trueing, etc.

A further object is to incorporate in the structure means to compensate for misalignment between the supporting and supported elements.

For an understanding of the above objects, there is described in the following specification two of several possible embodiments which are illustrated in the accompanying drawings, wherein:

Figure 5 is a plan view, as in Figure 1, illustrating an alternate embodiment; and Figure 6 is an elevation view from line 6—6 of Figure 5.

Figure 1:
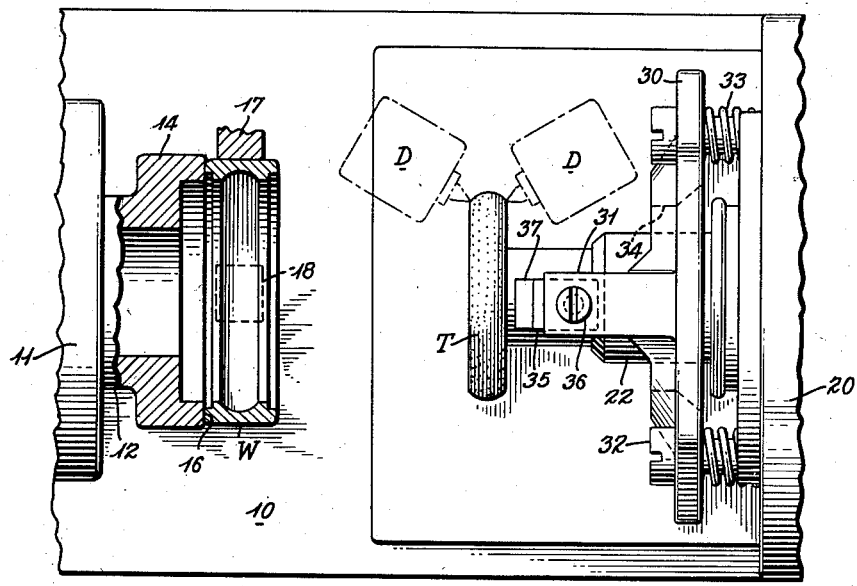
Figure 1 is a plan view of the device of this invention shown in relationship to a grinder.

Referring to Figure 1, there is shown the upper surface 10 of a grinding machine bed having a headstock 11 mounted thereon. In the headstock is journaled a rotatable spindle 12 having a portion 14, which is a magnetic device, presenting a face 16 normal to the spindle axis against which a workpiece W may be held in frictional relationship while being radially supported by shoes 17 and 18 in a manner well known in the art. To the right is shown a tool head 20 in which is journaled a rotatable spindle 22 with a tool T. The headstock and the tool head are arranged in the usual manner of this class of machine for relative longitudinal and transverse feed movements. Figure 1 shows the tool withdrawn from the grinding zone and in position to be trued by a device D shown in dash-dot lines in two positions. In this particular case the device D, which has diamond point, is arranged for a curvilinear translation between the two positions shown for the purpose of generating a convex profile on the tool or grinding wheel. When the wheel is moved longitudinally to the grinding position (Fig. 3) and the transverse feed motion is imparted, a complementary concave profile will be produced in the workpiece W. The workpiece exemplified has at its end faces narrow rims which constitute part of the frictional speed control components in the system. The area of the rim is ample to drive the workpiece at the control speed of the headstock spindle against the friction of the radially supporting shoes, but with the grinding wheel rotating in contact with the workpiece and in the same direction, the forces thereby introduced will overcome the friction between the workpiece and its supports with the result that undesired speedup may take place, causing the workpiece to "spin." To prevent this speedup, these friction forces should be augmented during the grinding process.

Figure 2:
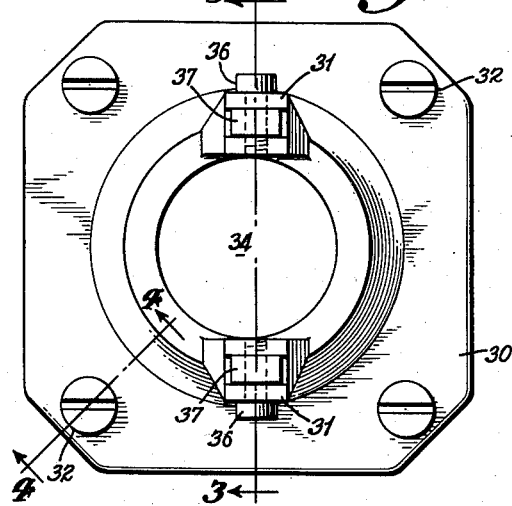
Figure 2 is a front elevation view of the device.
Figure 3:
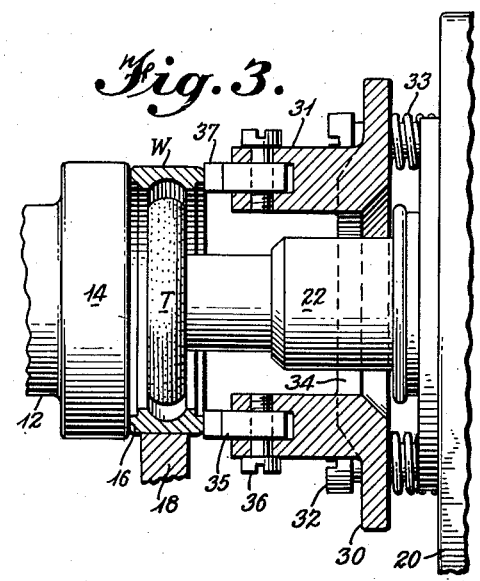
Figure 3 is a side elevation view partially in section along line 3—3 of Figure 2, showing the device and tool in grinding position.
Figure 4:
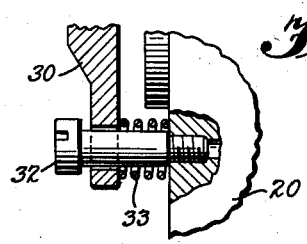
Figure 4 is a fragmental sectional view of a detail taken along line 4—4 of Figure 2.

In Figures 2 and 3, an annular body 30 with a flange thereon is shown having integral posts 31—31. The body 30 is slidably mounted on shoulder bolts 32 threaded into the toolhead 20 (Fig. 4). Surrounding these bolts 32 between the tool head and body 30 are compression coil springs 33 consistently urging body 30 away from the tool head a distance limited by the heads of the bolts (Fig 1). A central aperture 34 gives access for spindle 32. Each of the posts 31 are in their outer extremities slotted in a direction parallel to the feed direction and in these slots are located blocks 35—35 pivoted about hinge bolts 36 with the axes thereof normal to the line of feed direction. The blocks 35 present face portions 37 directed towards face 16, normally in a parallel plane thereto. This face portion may be of suitable friction and/or hard material; e. g., tungsten carbide, ceramic, bonded abrasives, or the like. Because of hinged arrangement of the blocks 35 and yieldable support of body 30, the system as a whole and the blocks independently are permitted a limited amount of displacement, allowing surface portion 37 to compensate for misalignment without relieving the pressure of the shoes against the workpiece in the active position of Fig. 3.

The device is fixedly mounted in transverse direction relative to the spindle 22, and is resiliently mounted in longitudinal direction in a manner that when face portions 37 abut the workpiece there is a lost motion space between the heads of bolts 32 and body 30, as shown in Fig. 3.

The operation of the friction augmenter is believed to be evident from the above description; however, it is briefly as follows: The workpiece W is rotated by the magnetic driver device 14 and is radially positioned by the supporting shoes 17 and 18. When the tool head 20 is longitudinally moved to place the tool T in grinding position (Fig. 3), the friction augmenter applies a braking force to the workpiece W as the body 30 has moved the braking surface 37 into contact with end face of the workpiece W. This force prevents the workpiece from "spinning" and helps keep the rotational speed of the workpiece at the desired rate. As explained above, any misalignment is automatically compensated without reducing the braking force when the brake is in the operating or grinding position.

Figures 5 and 6 illustrate an alternate embodiment where the friction-augmenting device is mounted in fixed relationship to the workpiece holder and driving means.

On the upper surface 110 of a grinding machine bed is mounted a headstock 111 containing a rotatable spindle 112 having a portion 114 presenting a face 116 normal to the spindle axis against which a workpiece W may be held in frictional relationship while being radially supported by shoes 117 and 118 in a manner well known in the art. To the right is shown a toolhead 120 in which is journaled a rotatable spindle 122 with a tool T. A bracket 140 is mounted on the surface 110 and fixed thereto by bolts 141 passing through elongated holes in the bracket to allow for longitudinal adjustable positioning of this bracket, in which is journaled a shaft 142 having flattened portions at its ends to which flexible reeds 144—144 are attached by several screws 143. To the outer extremes of these reeds are attached members 131—131 by several screws 145. These members have slots in their outer extremities, and in the slots are located blocks 135 pivoted about hinge bolts 136. The blocks present face portions 137 directed towards face 116. The central part of the shaft 142 carries a pin 146 fixed thereto by suitable means; e. g., a set screw as indicated. Elongated holes 147 in the bracket leave access for this pin allowing for a limited pivotal movement of shaft 142 while restraining any axial movement at the shaft. One end of pin 146 forms a hand grip and between the other end and the bracket is connected a tension coil spring 148.

The device is positioned so that the face portions 137 are contacting the outer end face of a workpiece preferably on a diameter normal to the feed direction. In setting up the device the bracket 140 may be positioned longitudinally in a position that when the face portions 137 contact the workpiece the spring force of 148 introduces a bias on the reed 144—144. It is clear that because of the flexible reeds and the pivoted blocks, the face portions 137 in operative position will, together and separately, constantly exert their desired braking effect irrespective of unevenness of the contacted surface. The hand grip of pin 146 serves as means to, at will, relieve the braking pressure.

The applicant has disclosed two preferred embodiments of a frictional-augmenting device as illustrative examples which may be modified in numerous particulars without departing from the spirit and scope of this invention as defined in the following claims.

I claim:

1. In an internal centerless grinder having a rotatable work driver adapted to contact an end face of an annular workpiece, means for radially and frictionally supporting the workpiece on its outside perimeter, and a rotatably mounted tool carried by a head which is adapted for movement longitudinally to a grinding position and for transverse feed movement, a friction augmenter that comprises: a non-rotatable braking device having a frictional braking surface carried by the tool head and adapted to contact an opposite end face of the annular workpiece when the tool is moved longitudinally into the grinding position to create a frictional drag on the rotating workpiece thereby preventing the workpiece from spinning when the tool is in contact with the surface thereof, and means mounting the braking device on the tool head whereby any misalignment between the braking device and the workpiece will be automatically compensated.

2. In an internal centerless grinding machine of the class having a headstock containing a rotatable spindle with a surface thereon normal to the axis of the spindle for axially supporting and driving a workpiece by an end face thereof, support means for supporting the workpiece on its outer preformed periphery, and a tool carried by a rotatable spindle journaled in a tool head, the tool head and headstock being adapted for relative longitudinal and transverse feed movements into and out of grinding position, the improvement that comprises a non-rotatable braking device having a frictional braking surface adapted to contact an opposite end face of the annular workpiece for preventing the workpiece from spinning when the tool is in contact with the surface thereof by applying additional frictional drag to the workpiece, and means actuating the braking device to place its frictional braking surface against the end face of the workpiece when the tool is moved into grinding position.

3. A device as defined in claim 2 wherein the braking device is carried by the tool head.

4. A device as defined in claim 3 wherein the braking device mounting on the tool head is yieldable to permit a limited amount of displacement to compensate for any misalignment.

5. A device as defined in claim 4 wherein the braking device comprises: an annular body providing access for the tool spindle, and brake blocks pivotally mounted on the annular body, the brake blocks being provided with a friction surface for contacting the workpiece.

6. In an internal centerless grinder having a rotatable work driver adapted to contact an end face of an annular workpiece, means for radially and frictionally supporting the workpiece on its outside perimeter, and a rotatably mounted tool carried by a head which is adapted for movement longitudinally to a grinding position and for transverse feed movement, a friction augmenter that comprises; a biased non-rotatable braking device having a frictional braking surface adapted to be positioned to selectively contact and apply a frictional drag on an opposite end face of the annular workpiece so as to prevent the workpiece from spinning when the tool is in contact with the surface thereof, means mounting the braking device to automatically compensate for any misalignment between the braking surface of the braking device and the workpiece, and selectively operable means to release the braking force applied to the workpiece.

7. In an internal centerless grinding machine of the type having a headstock containing a rotatable spindle with a magnetic surface thereon normal to the axis of the spindle for axially supporting and driving a workpiece by an end face thereof, at least one workrest for radially supporting the workpiece on its outer preformed periphery, and a tool carried by a rotatable spindle journaled in a tool head, the tool head and headstock being arranged for relative longitudinal movement into and out of grinding position and for relative transverse feed movements, the improvement that comprises: a non-rotatable braking device for applying a frictional drag on the workpiece so as to prevent the workpiece from spinning when the tool is in contact with the surface thereof, the braking device having a braking surface adapted to contact an opposite end face of the workpiece; means normally biasing the braking surface against the opposite end surface of the workpiece; and hand-operated means for selectively opposing the biasing means to release the braking force on the workpiece.

8. In an internal centerless grinder having a rotatable work driver adapted to contact an end face of an annular workpiece, means for radially and frictionally supporting the workpiece on its outside perimeter, and a rotatably mounted tool carried by a head which is adapted for movement longitudinally to a grinding position and for transverse feed movement, a friction augmenter that comprises: a non-rotatable braking device having a frictional braking surface adapted to selectively contact an opposite end face of the annular workpiece so as to prevent the workpiece from spinning when the tool is in contact with the surface thereof, and means mounting the braking device whereby any misalignment between the braking device and the workpiece will be automatically compensated.

References Cited in the file of this patent

UNITED STATES PATENTS

| | | |
|---|---|---|
| 2,478,607 | Theler et al. | Aug. 9, 1949 |
| 2,706,369 | Dix | Apr. 19, 1955 |
| 2,754,641 | Bidwell | July 17, 1956 |